United States Patent
Son

(10) Patent No.: US 10,597,090 B2
(45) Date of Patent: Mar. 24, 2020

(54) VEHICLE BODY STRUCTURE

(71) Applicants: Hyundai Motor Company, Seoul (KR); Kia Motors Corporation, Seoul (KR)

(72) Inventor: Kyung Hoon Son, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 79 days.

(21) Appl. No.: 15/970,714

(22) Filed: May 3, 2018

(65) Prior Publication Data
US 2019/0210654 A1 Jul. 11, 2019

(30) Foreign Application Priority Data

Jan. 10, 2018 (KR) .......................... 10-2018-0003192

(51) Int. Cl.
*B62D 25/06* (2006.01)
*B62D 29/00* (2006.01)
*B62D 25/04* (2006.01)

(52) U.S. Cl.
CPC ............. *B62D 25/06* (2013.01); *B62D 25/04* (2013.01); *B62D 29/008* (2013.01)

(58) Field of Classification Search
CPC ................................. B62D 25/06; B62D 25/04
See application file for complete search history.

(56) References Cited

U.S. PATENT DOCUMENTS

| 8,899,665 | B2* | 12/2014 | Yoshida | B21D 7/08 |
| | | | | 296/193.06 |
| 10,399,602 | B2* | 9/2019 | Jun | |
| 2001/0033096 | A1* | 10/2001 | Hanyu | B62D 21/15 |
| | | | | 296/203.01 |
| 2012/0126582 | A1* | 5/2012 | Kishi | B62D 25/04 |
| | | | | 296/203.01 |
| 2014/0138988 | A1* | 5/2014 | Kisaku | B62D 25/02 |
| | | | | 296/210 |
| 2016/0083018 | A1* | 3/2016 | Anegawa | B62D 25/04 |
| | | | | 296/193.05 |
| 2016/0236722 | A1* | 8/2016 | Nakamura | B62D 25/06 |
| 2017/0305469 | A1* | 10/2017 | Iyoshi | B62D 25/04 |
| 2017/0305470 | A1* | 10/2017 | Sato | B62D 25/02 |
| 2018/0237072 | A1* | 8/2018 | Jun | B62D 21/157 |
| 2019/0047636 | A1* | 2/2019 | Asa | B62D 25/025 |

* cited by examiner

*Primary Examiner* — Lori L Lyjak
(74) *Attorney, Agent, or Firm* — Morgan, Lewis & Bockius LLP

(57) ABSTRACT

A vehicle body may include a front pillar vehicle extending in the height direction of the vehicle and positioned forwardly along the longitudinal direction of the vehicle; a rear pillar vehicle extending in the height direction of the vehicle and positioned reward along the longitudinal direction of the vehicle; a roof side member extending along the longitudinal direction of the vehicle to couple with the front pillar and the rear pillar and disposed on both first and second sides along the width direction of the vehicle; and at least one roof rail extending along the width direction of the vehicle to connect the roof side members on both first and second sides, achieving a stable and robust upper vehicle body with only two pillars.

16 Claims, 14 Drawing Sheets

VEHICLE BODY STRUCTURE

CROSS-REFERENCE TO RELATED APPLICATION

The present application claims priority to Korean Patent Application No. 10-2018-0003192 filed on Jan. 10, 2018, the entire contents of which is incorporated herein for all purposes by this reference.

BACKGROUND OF THE INVENTION

Field of the Invention

The present invention relates to a vehicle body structure, and more particularly, to a vehicle body structure in which a stable and rigid vehicle body can be formed only by a front pillar and a rear pillar without a center pillar.

Description of Related Art

Generally, a top vehicle body may include a roof forming the roof of the vehicle and at least one pillar disposed back and forth along the longitudinal direction of the vehicle while supporting the roof.

At least one pillar may include typically a front pillar disposed on the front along the longitudinal direction of the vehicle, a rear pillar disposed on the rear along the longitudinal direction of the vehicle and a center pillar disposed between the front pillar and the rear pillar.

A door for opening or closing the passenger compartment is rotatably mounted at the front pillar and the center pillar.

Recently, a vehicle body structure has been developed and applied to an upper vehicle body using only the front pillar and rear pillar without using the center pillar to expand the passenger compartment and increase the convenience of getting on or off.

However, in such the above-described vehicle body structure, since the center pillar is not used, the structural rigidity of the upper vehicle body is inevitably weakened. As a result, various reinforcement structures have been provided to compensate for the weakening of the rigidity of the vehicle body structure. Thus, it was necessary to reinforce the stiffness of the upper vehicle body more effectively without increasing the weight and cost.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle body structure configured for forming more robust upper vehicle body through the stiffness increase and the proper load distribution of the members of the members forming the roof without applying the center pillar.

A vehicle body structure according to an exemplary embodiment of the present invention may include a front pillar vehicle extending in the height direction of the vehicle and positioned forwardly along the longitudinal direction of the vehicle; a rear pillar vehicle extending in the height direction of the vehicle and positioned reward along the longitudinal direction of the vehicle; a roof side member extending along the longitudinal direction of the vehicle to couple with the front pillar and the rear pillar and disposed on both left and right sides along the width direction of the vehicle; and at least one roof rail extending along the width direction of the vehicle to connect the roof side members on both left and right sides.

The at least one roof rail may include a front roof rail disposed forwardly along the longitudinal direction of the vehicle; and a rear roof rail disposed behind the front roof rail along the longitudinal direction of the vehicle.

A cowl member formed to extend along the width direction of the vehicle may be further included; and the cowl member may be connected to the roof side member through a first coupling and a second coupling member.

The roof side member, the front roof rail and the cowl member may be formed in a tube shape via hydroforming method.

The center roof rail may include extruded aluminum with multiple closed cross-sections.

The multiple closed cross-sections may be three continuous closed cross-sections.

The first coupling member may include a receiving groove form at one side surface thereof; and a front end portion the roof side member along the longitudinal direction of the vehicle is inserted into the receiving groove to couple with the front pillar and the roof side member.

A front pillar internal member may be further included; and a front end portion of the roof side member along the longitudinal direction of the vehicle may be inserted into one side of the front pillar internal member to be supported.

An end portion of the cowl member may be coupled to the second coupling member; and the second coupling member may be coupled to the first coupling member.

A lower gusset and an upper gusset may be further included; and the roof side member may be coupled with the front roof rail and the center roof rail via the lower gusset and the upper gusset.

The lower gusset and the upper gusset may be disposed to overlap with each other; and an end portion of the roof side member or the center roof rail may be inserted into the upper gusset to be coupled thereto.

A boss may be formed at the lower gusset; at least bolt hole may be formed at the boss; a receiving groove, into which an end portion of the front roof rail or the center roof rail inserted, may be formed at the upper gusset; and at least one bolt hole may be formed at a wall surface of the receiving groove.

A welding hole for inserting a welding gun may be formed at the boss of the lower gusset.

A cowl top panel and a cowl supporting member coupled to the cowl top panel may be further included;

A stepped receiving portion may be formed at the cowl supporting member; and the cowl member may be located between the stepped receiving portion the cowl top panel to be integrally coupled thereto.

In accordance with a vehicle body structure according to an exemplary embodiment of the present invention, the cow member, the roof side member and the front roof rail are fabricated in tube form using the hydroforming method, and the center roof rail is formed in a form of extruded beams to couple to each other, so that the weight reduction and rigidity increase of the upper vehicle body may be achieved.

By applying coupling members to the joint portion between the cowl member and the roof side member, the collision stiffness of the vehicle body may be improved by effective transmission and dispersion of the collision load.

It is possible to improve the stiffness and load bearing performance of the roof by constructing the double coupling closed cross-section via the upper and lower gussets at the joints portion of the roof side member and the front roof rail.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
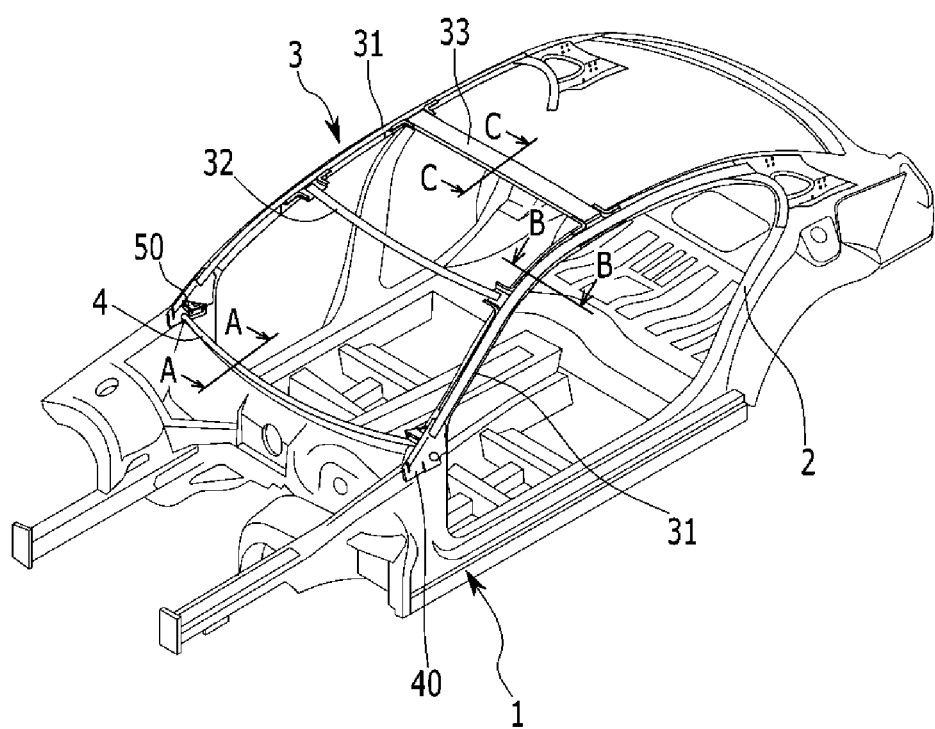
FIG. 1 is an exemplary perspective view of a vehicle body structure according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the contrary, the invention(s) is/are intended to cover not only the exemplary embodiments of the present invention, but also various alternatives, modifications, equivalents and other embodiments, which may be included within the spirit and scope of the invention as defined by the appended claims.

While the disclosure will be described in conjunction with exemplary embodiments of the present invention, it will be understood that present description is not intended to limit the disclosure to those exemplary embodiments. On the other hand, the disclosure is directed to cover not only the exemplary embodiments of the present invention, but also various alternatives, modifications, equivalents and other exemplary embodiments of the present invention, which may be included within the spirit and scope of the disclosure as defined by the appended claims. The terminology used herein is for describing various exemplary embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in the present embodiment, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, to make the description of the present invention clear, unrelated parts are not shown and, the thicknesses of layers and regions are exaggerated for clarity. Furthermore, when it is stated that a layer is "on" another layer or substrate, the layer may be directly on another layer or substrate or a third layer may be disposed there between. It is understood that the term "vehicle" or "vehicular" or other similar term as used herein is inclusive of motor vehicle in general such as passenger vehicles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g., fuels derived from resources other than petroleum). An exemplary embodiment of the present invention will now be described more specifically with reference to the accompanying drawing.

Referring to FIG. 1, a vehicle body structure according to an exemplary embodiment of the present invention may include a front pillar 1 extending in the height direction of the vehicle and positioned forwardly along the longitudinal direction of the vehicle and a rear pillar 2 located at the rear.

A roof 3 forming a vehicle roof may include a roof side member 31 extending along the longitudinal direction of the vehicle extend to couple to the front pillar and the rear pillar 2 and disposed on both the left and right sides along the width direction of the vehicle, a center roof rail 33 extending along the width direction of the vehicle to connect both the left and right roof side members 31 and disposed on the front along the longitudinal direction of the vehicle and a center roof rail 33 extending along the width direction of the vehicle extend to connect both the left and right roof side members 31 and disposed behind the front roof rail 32 along the longitudinal direction of the vehicle.

A front end portion of the roof side member 31 along the longitudinal direction of the vehicle may be connected to the front pillar 1 via a first coupling member 40 and a rear portion of the roof side member 31 may be connected to the rear pillar 2.

A cowl member 4 extending along the width direction of the vehicle may be connected to the roof side member 31 via the first coupling member 40 and a second coupling member 50.

Figure 2:
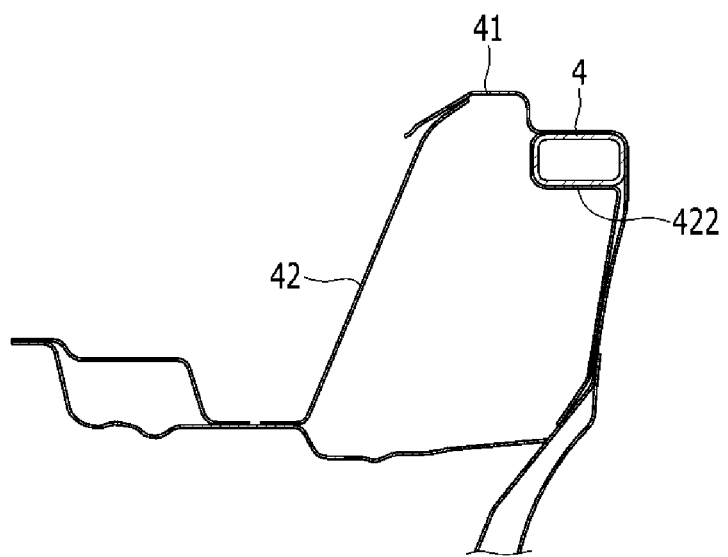
FIG. 2 is an exemplary A-A line cross-sectional view of FIG. 2 according to an exemplary embodiment of the present invention.
Figure 3:
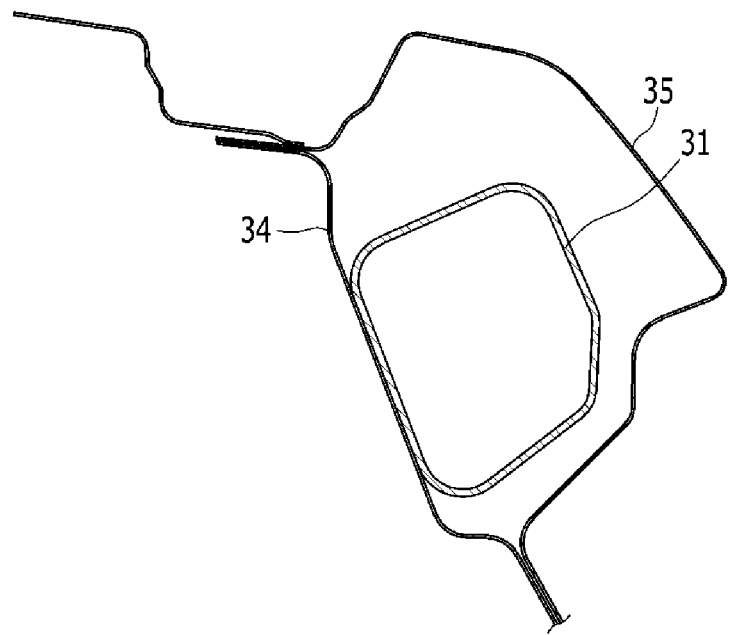
FIG. 3 is an exemplary B-B line cross-sectional view of FIG. 3 according to an exemplary embodiment of the present invention.
Figure 4:
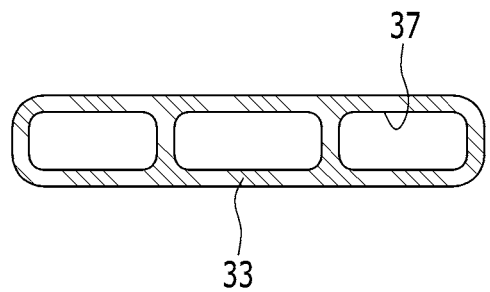
FIG. 4 is an exemplary C-C line cross-sectional view of FIG. 1 according to an exemplary embodiment of the present invention.

Referring to FIG. 2, FIG. 3 and FIG. 4, the roof side member 31, the front roof rail 32 and the cowl member 4 may be formed in a tube shape by use of a hydroforming method.

In an exemplary embodiment of the presently claimed invention, the roof side member 31, the front roof rail 32 and the cowl member 4 may be formed in a tube shape having a plurality of channels 37 therein.

The center roof rail 33 may include aluminum extruded to have multiple closed cross-sections, accounting for the weight and mass center of the vehicle.

Multiple closed cross-sections present three consecutive closed cross-sections in an exemplary embodiment of the present invention, but are not limited thereto and may be configured to have one closed cross-section or two or more continuous closed cross-sections.

Figure 5:
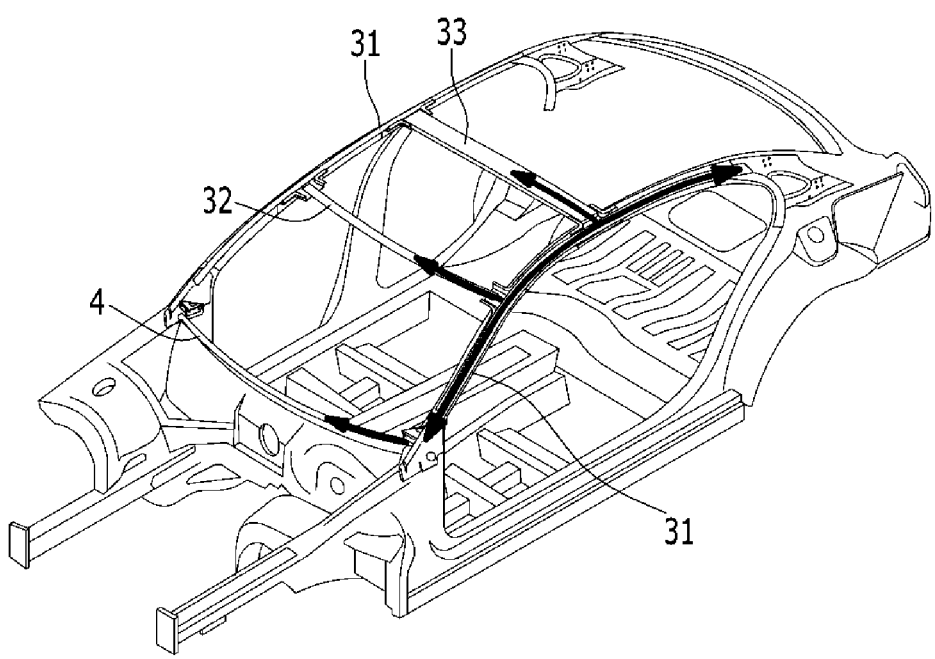
FIG. 5 is an exemplary diagram illustrating load distribution and transmission of a vehicle body structure according to an exemplary embodiment of the present invention.

Thus, as shown in FIG. 5, when a load is applied to the vehicle roof, the roof side member 31, the front roof rail 32, and the cowl member 4, which are formed in a tube shape at the closed cross-section, may exhibit smooth load support and dispersion effects in the load transmission path due to the rigidity increase.

That is, the load applied to the roof side member 31 is transmitted back and forth along the longitudinal direction of the vehicle and distributed in the vehicle's width direction through the cowl member 4, the front roof rail 32 and the center roof rail 33.

In FIG. 2, reference numeral 41 denotes a cowl top panel, and reference 42 denotes a cowl supporting member fixedly coupled to the cowl top panel 41. A stepped receiving portion 422 is formed in the cowl supporting member 42 so that the cowl member 4 is interposed between the stepped receiving portion 422 and the cowl top panel 41 to be coupled together.

In FIG. 3, reference numeral 34 denotes a roof side internal member and 35 denotes a side external member.

The roof side internal member 34 and the side external member 35 may be coupled to each other to form a closed cross-section, and the roof side member 31 may be inserted into the closed cross-section and coupled to the roof side internal member 34.

Figure 6:
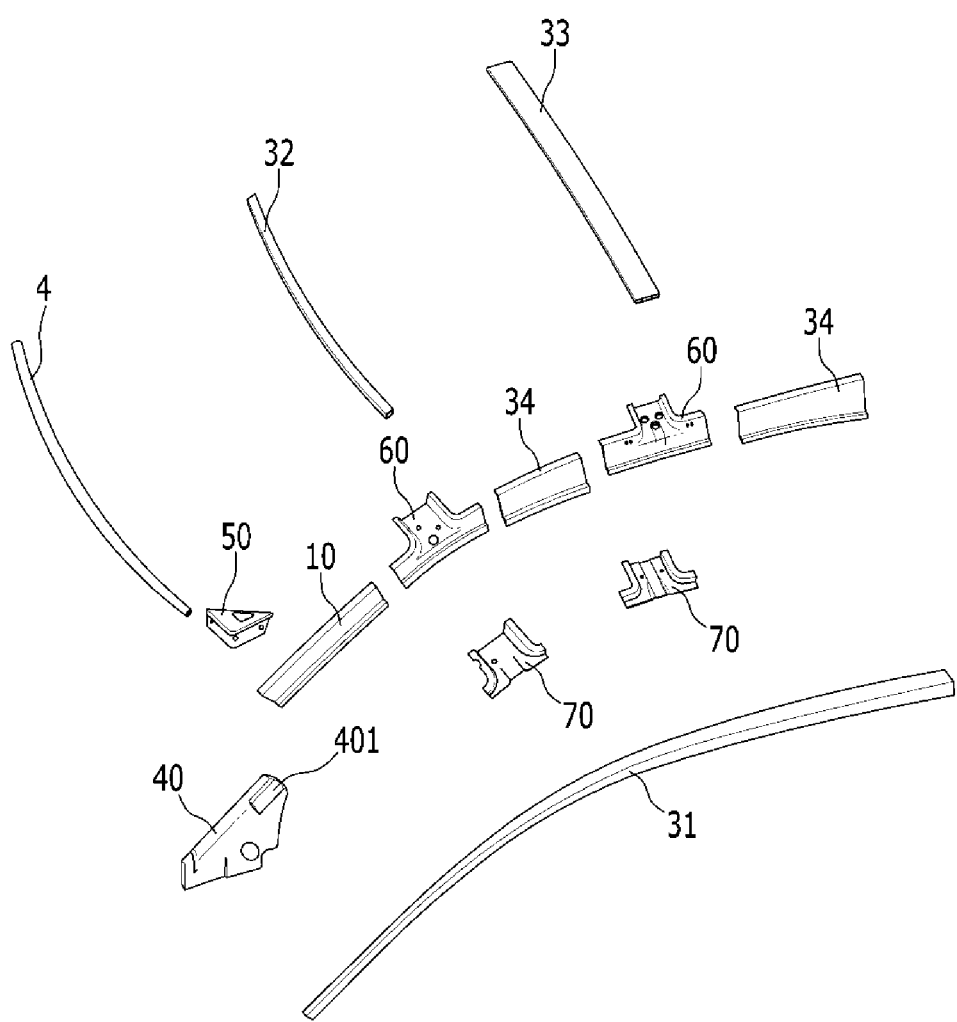
FIG. 6 is an exemplary exploded perspective view of a vehicle body structure according to an exemplary embodiment of the present invention.
Figure 7:
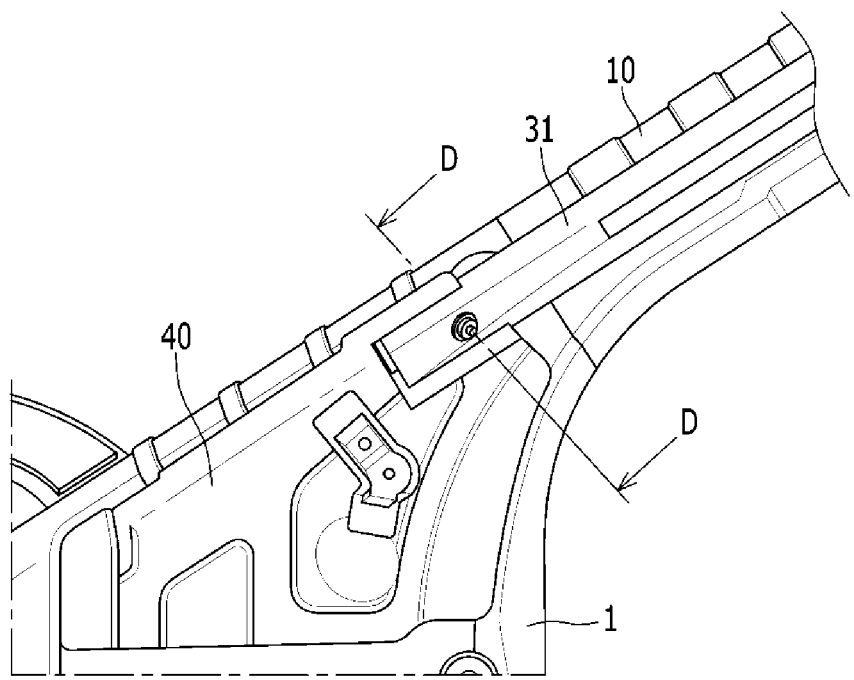
FIG. 7 is an exemplary external side view showing a coupling relationship between the roof side member and the front pillar of a vehicle body structure according to the exemplary embodiment of the present invention.
Figure 8:
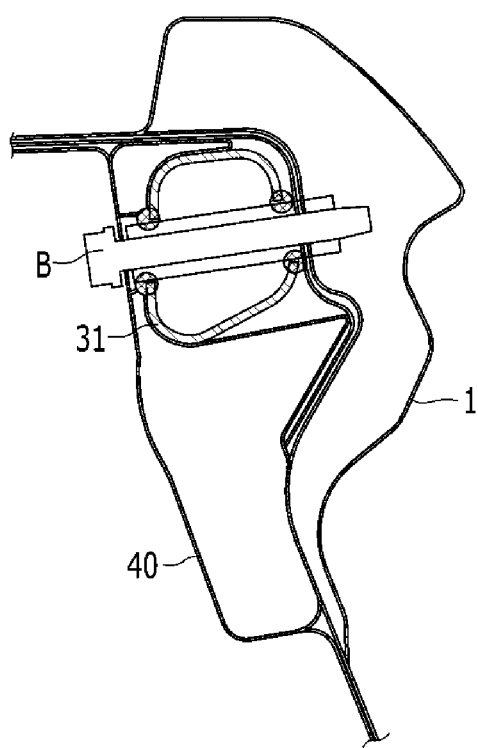
FIG. 8 is an exemplary D-D line cross-sectional view of FIG. 7 according to an exemplary embodiment of the present invention.

Referring to FIG. 6, FIG. 7, and FIG. 8, a front end portion of the roof side member 31 along the longitudinal direction of the vehicle may be connected to the front pillar 1 through the first coupling member 40.

The first coupling member 40 may be formed in a substantially triangle shape. A receiving groove 401 may be formed at one surface of the coupling member 40. The front end portion of the roof side member 31 along the longitudinal direction of the vehicle may be inserted into the receiving groove 401 and engaged with the front pillar 1 and the first coupling member 40 via bolts B.

The front end portion of the roof side member 31 along the longitudinal direction of the vehicle may be inserted into one side surface of the front pillar internal member 10 to be supported.

Figure 9:
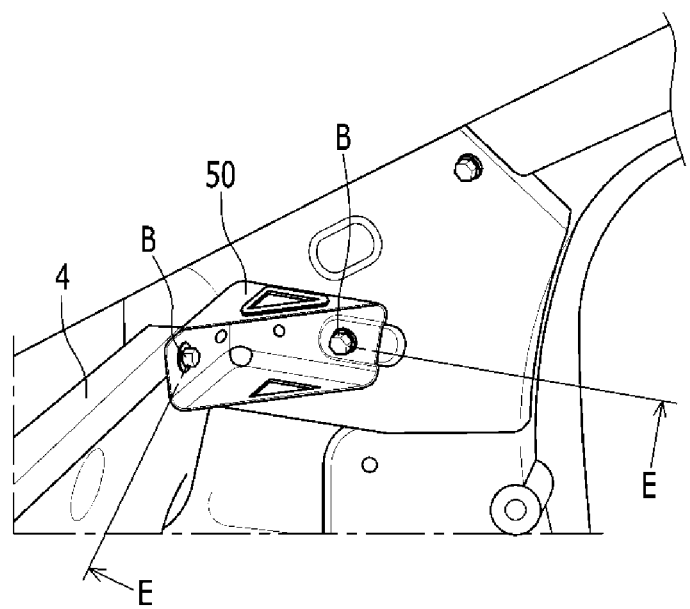
FIG. 9 is an exemplary internal side view showing a coupling relationship between a cow member, a roof side member, and a front pillar of a vehicle body structure according to an exemplary embodiment of the present invention.
Figure 10:
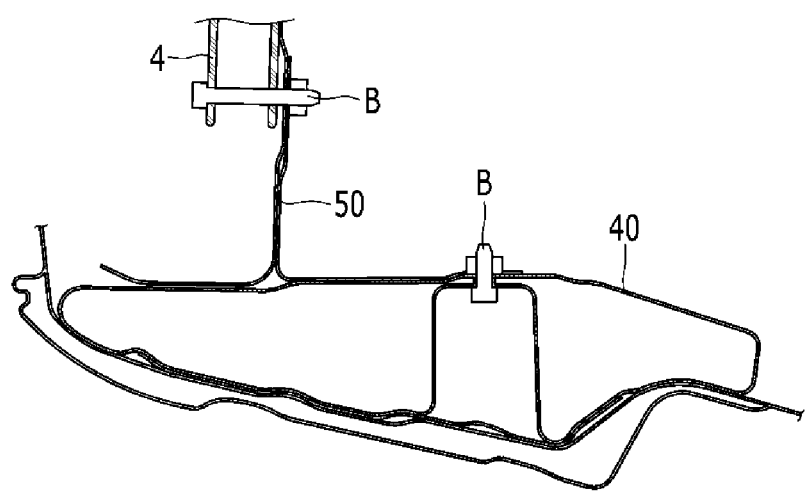
FIG. 10 is an exemplary E-E line cross-sectional view of FIG. 9 according to an exemplary embodiment of the present invention.
Figure 11:
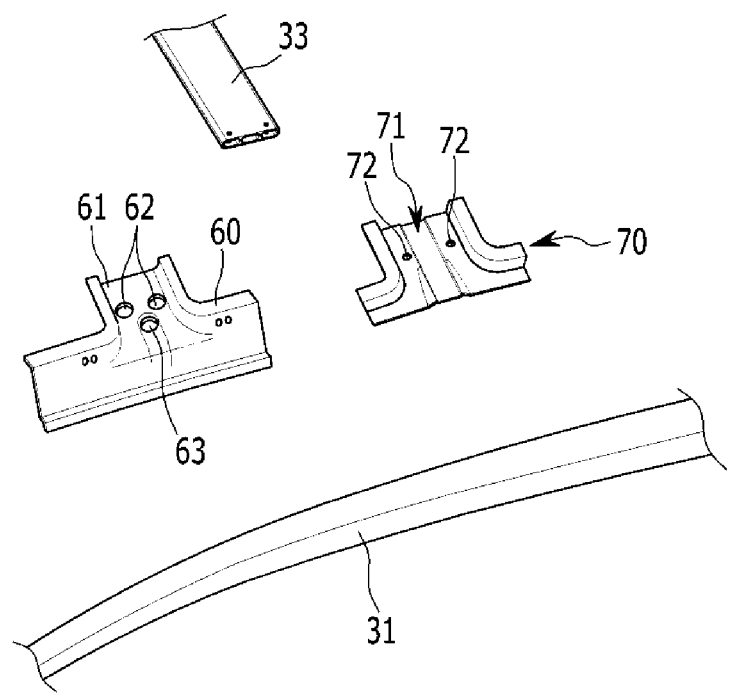
FIG. 11 is an exemplary exploded perspective view of the roof side member and the center roof rail of a vehicle body structure according to an exemplary embodiment of the present invention.
Figure 12:
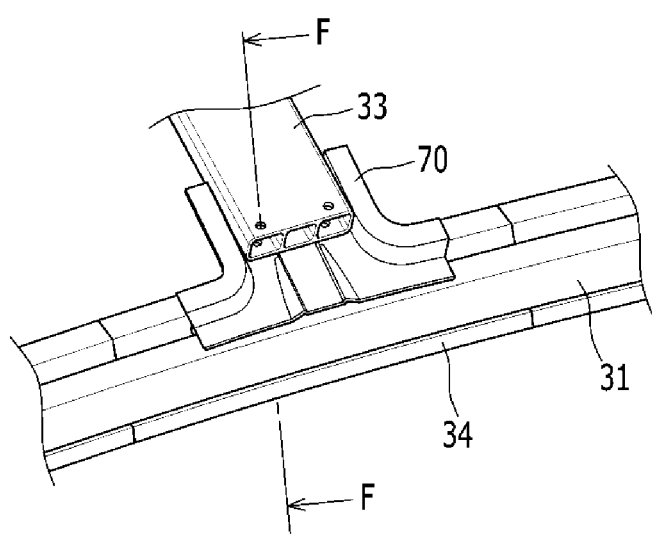
FIG. 12 is an exemplary coupling perspective view of the roof side member and the center roof rail of a vehicle body structure according to an exemplary embodiment of the present invention.
Figure 13:
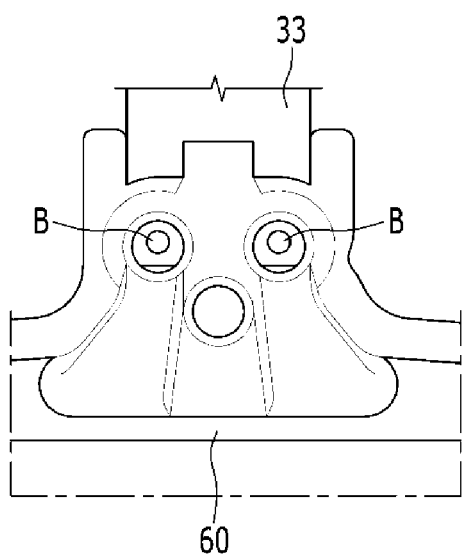
FIG. 13 is another exemplary coupling perspective view of the roof side member and the center roof rail of a vehicle body structure according to an exemplary embodiment of the present invention.
Figure 14:
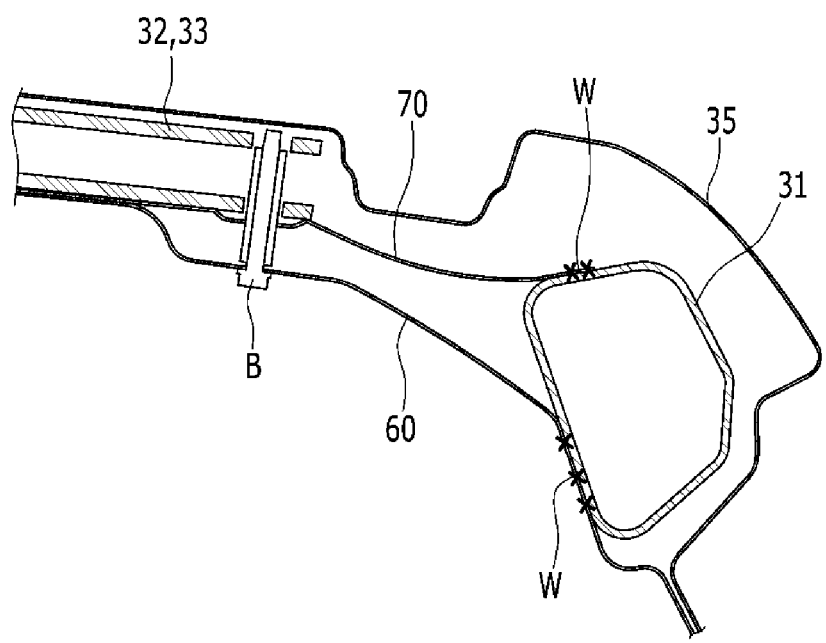
FIG. 14 is an exemplary F-F line cross-sectional view of FIG. 12 according to an exemplary embodiment of the present invention.

Referring to FIG. 9 and FIG. 10, both end portions of the cowl member 4 may be engaged with the second coupling member 50 via bolts B and the second coupling member 50 may be engaged with the first coupling member 40 via bolts B.

Accordingly, the cowl member 4 is connected to the roof side member 31 through the first coupling member 40 and the second coupling member 50, achieving smooth load transmission and distribution.

Referring FIG. 6 and FIG. 11 to FIG. 14, the roof side member 31 may be coupled to the front roof rail 32 and the center roof rail 33 via a lower gusset 60 and an upper gusset 70.

The lower gusset 60 and the upper gusset 70 may be disposed to overlap each other. An end portion of the front roof rail 32 or the center roof rail 33 may be inserted into the upper gusset 70 and bolts B penetrate the lower gusset 60 and the upper gusset 70 to be fastened.

A boss 61 may be formed at the lower gusset 60. At least bolt hole 62 and an welding hole 63 may be formed at the boss 61. An end portion of the front roof rail 32 or the center roof rail 33 may be inserted into a receiving groove 71 formed at the upper gusset 70 and at least one bolt hole 72 may be formed at a wall surface of the receiving groove 71.

Furthermore, the lower gusset 60 and the upper gusset 70 may be coupled with the roof side member 31 by laser welding W.

Accordingly, the roof side member 31 is integrally connected to the front roof rail 32 and the center roof rail 33 through gussets, achieving smooth load transmission and distribution.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle body structure comprising:
   a front pillar extending in a height direction of a vehicle and positioned forwardly along a longitudinal direction of the vehicle;
   a rear pillar extending in the height direction of the vehicle and positioned rearwards along the longitudinal direction of the vehicle;
   a roof side member extending along the longitudinal direction of the vehicle to couple with the front pillar and the rear pillar and disposed on first and second predetermined sides along a width direction of the vehicle;
   at least one roof rail extending along the width direction of the vehicle to connect the roof side members on the first and second predetermined sides; and
   a cowl member formed to extend along the width direction of the vehicle, wherein the cowl member is connected to the roof side member through a first coupling member and a second coupling member.

2. The vehicle body structure of claim 1, wherein the at least one roof rail includes:
   a front roof rail disposed forwardly along the longitudinal direction of the vehicle; and
   a center roof rail disposed behind the front roof rail along the longitudinal direction of the vehicle.

3. The vehicle body structure of claim 2, wherein the roof side member, the front roof rail and the cowl member are formed in a tube shape via hydroforming method.

4. The vehicle body structure of claim 3, wherein the tube shape includes a plurality of channels.

5. The vehicle body structure of claim 2, wherein the center roof rail includes extruded aluminum with multiple closed cross-section.

6. The vehicle body structure of claim 5, wherein the multiple closed cross-section is three continuous closed cross-sections.

7. The vehicle body structure of claim 1, wherein the first coupling member includes a receiving groove formed at a side surface thereof; and
   a front end portion of the roof side member along the longitudinal direction of the vehicle is inserted into the receiving groove to couple with the front pillar and the roof side member.

8. The vehicle body structure of claim 1, further including a front pillar internal member, wherein a front end portion of the roof side member along the longitudinal direction of the vehicle is inserted into a side of the front pillar internal member to be supported thereby.

9. The vehicle body structure of claim 1, wherein an end portion of the cowl member is coupled to the second coupling member; and
   the second coupling member is coupled to the first coupling member.

10. The vehicle body structure of claim 2, further including a lower gusset and an upper gusset, wherein the roof side member is coupled with the front roof rail and the center roof rail via the lower gusset and the upper gusset.

11. The vehicle body structure of claim 10, wherein the lower gusset and the upper gusset are disposed to overlap with each other; and
    an end portion of the roof side member or the center roof rail is inserted into the upper gusset to be coupled thereto.

12. The vehicle body structure of claim 10,
    wherein a boss is formed at the lower gusset; and
    wherein at least bolt hole is formed at the boss.

13. The vehicle body structure of claim 12, wherein a welding hole for inserting a welding gun is formed at the boss of the lower gusset.

14. The vehicle body structure of claim 10,
    wherein a receiving groove, into which an end portion of the front roof rail or the center roof rail inserted, is formed at the upper gusset to form a stepped shape; and
    at least one bolt hole is formed at a upper surface of the stepped shape in the receiving groove.

15. The vehicle body structure of claim 1, further including a cowl top panel and a cowl supporting member coupled to the cowl top panel,
    wherein a stepped receiving portion is formed at the cowl supporting member; and
    wherein the cowl member is interposed between the stepped receiving portion and the cowl top panel to be integrally coupled thereto.

16. The vehicle body structure of claim 1, further including a roof side internal member and a side external member, wherein the roof side internal member and the side external member are be coupled to each other to form a closed cross-section, and wherein the roof side member is inserted into the closed cross-section and coupled to the roof side internal member.

* * * * *